Feb. 4, 1969 A. GABOR 3,426,336
WRITE SYNCHRONIZING SYSTEM IN INCREMENTAL TAPE TRANSPORT
Filed Sept. 14, 1964
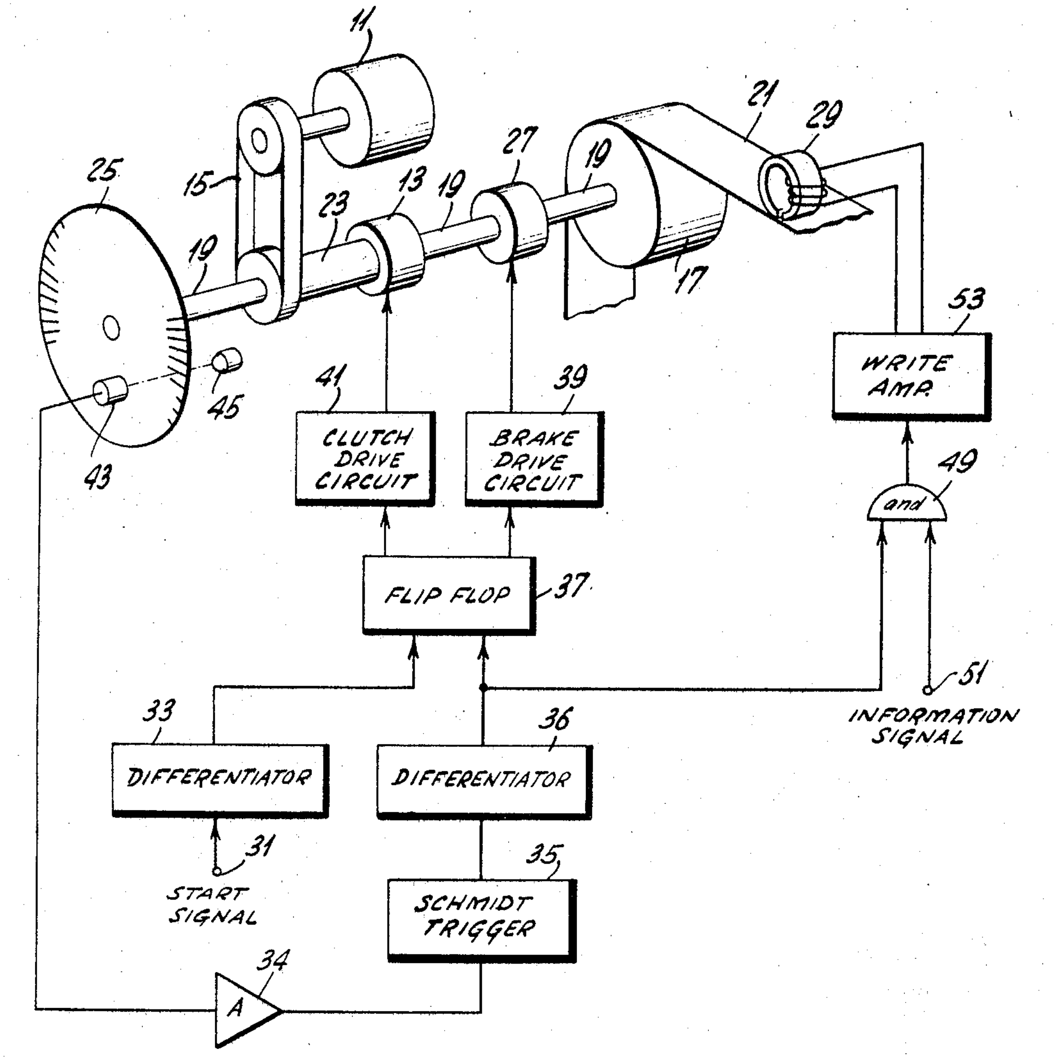
INVENTOR
ANDREW GABOR
BY
Douglas M. Clarkson
ATTORNEY

United States Patent Office 3,426,336

Patented Feb. 4, 1969

3,426,336

WRITE SYNCHRONIZING SYSTEM IN INCREMENTAL TAPE TRANSPORT

Andrew Gabor, Huntington, N.Y., assignor to Potter Instrument Company, Inc., Plainview, N.Y., a corporation of New York Filed Sept. 14, 1964, Ser. No. 396,062

U.S. Cl. 340—174.1 10 Claims

Int. Cl. G11b *5/00;* B65h *23/18*

ABSTRACT OF THE DISCLOSURE

In this incremental magnetic tape transport, information is recorded while the tape is moving. The position of the recording is synchronized with the tape movement by means of a tone wheel which moves in synchronism with the tape and produces output pulses in response to which the information is recorded.

This invention, generally, relates to write synchronizing systems and, more particularly, to a record synchronizing system for an incremental tape transport.

In contrast with conventional tape transports, which read out and record information while the tape runs continuously at a high speed, incremental tape transports read out and record one character at a time, and the tape is stopped between characters. Because incremental tape transports start and stop between characters, they operate at much lower transfer rates than conventional tape transports, but they have an important advantage over conventional tape transports in that each character can be recorded on the tape or read out from the tape at any random selected time.

In a conventional tape transport the transfer of characters to or from the tape must be in synchronism with the tape movement. For this reason incremental tape transports are referred to as "asynchronous," whereas conventional tape transports are referred to as "synchronous." Because incremental tape transports are asynchronous, the need for costly buffering is eliminated, the information processed does not have to be divided into blocks of limited length corresponding to the capacity of the buffer, and uninterrupted communication is permitted.

Uninterrupted communication can be obtained in a conventional tape transport only with an elaborate reflexing buffer.

Signals were recorded in incremental tape transports prior to the present invention while the tape is stationary between incremental steps. It was felt that recording during the dwell period between steps minimized the bit spacing jitter since the contribution of tape movement to this jitter is small when the tape is relatively stationary.

In these incremental tape transports, however, the distance traveled by the tape while coasting to a stop after the stop signal is detected varies for each character, which causes a spacing error for the recorded character or bit. Since the braking of the tape is controlled by a tone wheel used in conjunction with a mechanical clutch and brake, the distance traveled by the tape between the initiation of the "brake" signal by the tone wheel and the actual mechanical braking of the tape will vary. Although this variation will not be large, when the small distances, usually in the thousandths of an inch of tape travel, are considered, the error can become significant in terms of error in the recorded bit spacing.

Accordingly, an object of the present invention is to provide an improved incremental tape transport.

Another object of the present invention is to eliminate error between the spacing of bits of information recorded on a magnetic tape in an incremental tape transport.

A further object of the present invention is to maintain the position of the recorded bit on a magnetic tape in an incremental tape transport in substantially the same portion of each incremental step.

Still another object of the present invention is to eliminate the dependence on clutch and brake characteristics of a magnetic tape drive in spacing a bit of recorded information on the tape in an incremental tape transport.

The recording system of the present invention utilizes means to produce "stop" pulses at substantially equidistant movement positions of the tape and means to advance the tape incrementally. There is no bit spacing error problem because the recording is accomplished at the moment the tone wheel mark is detected. As a result, the dependence of bit spacing on the uniformity of clutch and brake characteristics is eliminated.

Also, means is provided to place the information on the tape upon the sensing of a timing pulse. As a result, the position at which the tape is brought to a stop will not affect the information location on the tape, nor will the position be affected by the fact that particular incremental steps may be longer or shorter than usual.

Further objects and advantages of the present invention will become more readily apparent when taken in conjunction with the single figure of the drawings, which is a schematic illustration of a presently preferred embodiment of the invention.

As shown in the drawing, a motor 11 continuously drives the input of a coaxial clutch 13 at a constant speed by means of a belt and pulley arrangement 15. The clutch 13, when energized, drives a capstan 17 by means of a shaft 19. The capstan 17 in turn drives a magnetic information-storage tape 21. The driving connection from the belt and pulley arrangement 15 to the input of the clutch 13 is made by means of a hollow shaft 23 through which the shaft 19 passes.

On the opposite end of the shaft 19 from the capstan 17 a photoelectric tone wheel 25 is mounted. Thus, the tone wheel 25 is mechanically fixed to the capstan 17 and turns in synchronism with it. When the clutch 13 is energized, it will couple the input of the clutch 13 including the shaft 23 to the shaft 19, and thus, the motor 11 will drive the capstan 17. A coaxial brake 27 surrounds the shaft 19, and when the brake 27 is energized, it will stop the shaft 19 quickly.

In operation, when it is desired for the magnetic tape 21 to move forward one incremental step, the brake 27 will be deenergized to release the shaft 19 and the clutch 13 will be energized, so that the motor 11 begins to drive the capstan 17 and the magnetic tape 21. Then automatically the clutch 13 will be deenergized and the brake 27 will be energized to bring the capstan 17 and the magnetic tape 21 quickly to a stop after the magnetic tape 21 has moved through the desired incremental distance.

The tape 21 is driven past a set of recording heads which record a character on the tape each time the tape is moved one incremental step. Only one recording head 29 is shown in the drawings to simplify the schematic illustration.

The incremental movement of the tape is started in response to a pulse applied to an input terminal 31. When a pulse is applied to the input terminal 31, it is first differentiated by a differentiator circuit 33 and then is applied to a flip-flop circuit 37 to set the flip-flop circuit 37 in its "one" state. The flip-flop circuit 37 controls the energization of the clutch 13 and the brake 27.

When the flip-flop circuit 37 is in its "zero" state, it will apply an "enabling" signal to a brake drive circuit 39, and when the flip-flop circuit 37 is in its "one" state, it will apply an "enabling" signal to a clutch drive circuit 41. When the brake drive circuit 39 receives the enabling signal from the flip-flop circuit 37, it will energize the brake 27 to stop the shaft 19. When the clutch drive circuit 41 receives the enabling signal from the flip-flop circuit 37, it will energize the clutch 13 to couple the motor 11 to the shaft 19.

When the tape 21 is not moving, the flip-flop circuit 37 will be in its "zero" state, so that the brake 27 is energized and the clutch 13 is deenergized. When the flip-flop circuit 37 is set into its "one" state in response to a pulse applied to the input terminal 31, the brake 25 will be deenergized and the clutch drive circuit 41 will energize the clutch 13 to couple the output of the motor 11 to the shaft 19 so that the motor 11 begins driving the capstan 17 to move the tape 21.

After the tape has traveled the desired incremental distance, a stop signal from the tone wheel 25 will set the flip-flop circuit 37 back to its "zero" state. When a mark on the tone wheel 25 moves past the sensing position, a photocell 43, which is illuminated through the tone wheel 25 by means of a light source 45, will produce an output pulse. This output pulse is amplified by an amplifier circuit 34 and is applied to a Schmitt trigger circuit 35. In response to receiving the pulse, the Schmitt trigger 35 produces an output pulse, which is applied to a differentiator 36.

The differentiator circuit 36 differentiates the output pulse of the Schmitt trigger circuit 35 and applies it to the flip-flop circuit 37 to set the flip-flop circuit 37 back to its "zero" state to remove the enabling signal from the clutch drive circuit 41. Accordingly, the clutch drive circuit 41 will deenergize the clutch 13. When the flip-flop circuit 37 is in its "zero" state, it will enable the brake drive circuit 39, which will energize the brake 27 to stop the shaft 19 and the capstan 17 and also the tape 21. In this manner, the tape 21 is stopped in response to a tone wheel pulse.

As can be noted from the above description, there is no assurance that the magnetic tape 21 will stop in exactly equal increments apart every time. This is due to the fact that any play or slipping in either the clutch 13 or the brake 27 will cause the tape to stop at unequal distances apart prior to each recording operation. With the use of the present invention, however, it is assured that characters will be recorded on the magnetic tape 21 at equal distances apart and bit spacing error will be substantially eliminated.

To accomplish these ends, the tone wheel 25 is utilized in conjunction with the recording circuitry. The output of the differentiator circuit 36 is applied also to an AND gate 49 so that each time the tone wheel produces an output pulse, a pulse will be applied to the AND gate 49.

The information to be recorded, either a "one" or "zero," is supplied to the AND gate 49 from an input terminal 51. If the input is in the form of a pulse indicating a "one," the AND gate 49 provides an output to a write amplifier circuit 53, which then applies a signal to the recording head 29 to record a "one" on the tape 21.

In the system of the present invention, non-to-return-zero (NRZ) recording is used in that "ones" are recorded by reversing the flux and "zeroes" are recorded by maintaining the flux the same. Accordingly, when the AND gate 49 applies a signal to the write amplifier circuit 53 in response to a pulse from the differentiator circuit 36 and from a pulse from the input terminal 51, the write amplifier will reverse the current flowing through the coil of the recording head 29 so that the recording head reverses the flux applied to the tape 21 and, thus, records a "one."

If the information signal applied to the input terminal 51 is in the form of the absence of a pulse, representing a "zero," the AND gate 49 will not trigger and the write amplifier circuit 53 will not reverse the current applied to the recording head 29. Accordingly, no flux reversal is produced by the recording head 29, thus representing a "zero" on the magnetic tape 21.

In operation, when the clutch 13 engages shaft 19 to move the tape 21, the tone wheel 25 is rotated also. This produces an output pulse at the photocell 43 which results in a pulse applied to the AND gate 49. At the same time, an information signal appears at the input terminal 51 which, if it is in the form of a pulse, will enable the AND gate 49 to pass a signal to the write amplifier circuit 53 so that a "one" is recorded by the recording head 29 on the tape 21. The tape is stopped then by the same tone wheel signal as described above, which disengages the clutch 13 and engages the brake 27 to stop the magnetic tape 21.

The stopping of the tape is at a point past the recorded bit, however, due to the time lag inherently supplied by the electronic circuitry and the mechanical operation of the clutch and brake mechanisms. The next recording step takes place in an identical fashion, and thus, the recording of the information on the magnetic tape 21 is spaced equal distances apart because the signals depend only upon an output pulse from the tone wheel 25, rather than the starting and stopping controlled by the clutch 13 and the brake 27.

As pointed out above, the recording head 29 is one of a set of recording heads. Each of the recording heads has a similar control circuit so that the recording by each recording head is at the time the tone wheel pulse is produced. Accordingly, when the information is read out from the magnetic tape 21, the information will be more accurately reproduced because the distance between each bit of information is kept substantially constant even though the stepping is carried out at relatively high stepping rates.

The above description is of a presently preferred embodiment of the invention, and many modifications may be made thereto without departing from the spirit and scope of the invention, which is limited only as defined in the appended claims.

What is claimed is:

1. An incremental tape transport comprising,
a magnetic storage tape,
means to produce stop pulses as said tape moves through equidistant positions,
means to incrementally advance said tape including means selectively operable to drive said tape forward and means to stop said tape in response to said stop pulses, and
means selectively operable to record signals on said tape in responsee to said stop pulses.

2. An incremental tape transport comprising,
magnetic storage tape,
means to produce pulses as said tape moves through equidistant positions,
means to incrementally advance said tape, and
means selectively operable to record signals on said tape in response to and at the time of said pulses.

3. An incremental tape transport comprising,
a capstan for driving magnetic storage tape,
means to produce stop pulses as said capstan rotates through equidistant angular positions,
means to produce start pulses,
incremental drive means responsive to said stop pulses to stop said capstan and responsive to start pulses to initiate rotation of said capstan, and
means selectively operable to record signals on the tape driven by said capstan in response to and at the time of said stop pulses.

4. An incremental tape transport comprising,
a capstan for driving magnetic storage tape,
means to produce pulses as said capstan rotates through equidistant angular positions,
means to incrementally drive said capstan, and
means selectively operable to record signals on the tape driven by said capstan in response to said pulses.

5. An incremental tape transport comprising,
a capstan for driving magnetic storage tape,
a magnetic storage tape driven by said capstan, means to produce stop pulses as said capstan rotates through equidistant angular positions,
means to produce start pulses,
incremental drive means responsive to said stop pulses to stop said capstan and responsive to start pulses to initiate rotation of said capstan, and
means selectively operable to record signals on said magnetic storage tape in response to said stop pulses.

6. An incremental tape transport comprising,
a capstan for driving magnetic storage tape,
a magnetic storage tape driven by said capstan,
means to produce pulses as said capstan rotates through equidistant angular positions,
means to incrementally drive said capstan, and
means selectively operable to record signals on said magnetic storage tape in response to and at the time of said pulses.

7. An incremental tape transport comprising,
a capstan for driving magnetic storage tape,
a tone wheel driven by said capstan and operable to produce stop pulses as said capstan rotates through equidistant angular positions,
means to incrementally drive said capstan including means selectively operable to drive said capstan and means to stop said capstan in response to said stop pulses, and
means selectively operable to record signals on the tape driven by said capstan in response to and at the time of said stop pulses.

8. An incremental tape transport comprising,
a capstan for driving magnetic storage tape,
a tone wheel driven by said capstan and operable to produce pulses as said capstan rotates through equidistant angular positions,
means to incrementally drive said capstan, and
means selectively operable to record signals on the tape driven by said capstan in response to and at the time of said pulses.

9. An incremental tape transport comprising,
a capstan for driving magnetic storage tape, magnetic storage tape driven by said capstan,
a tone wheel fixed to said capstan operable to produce stop pulses as said capstan rotates through equidistant angular positions,
means to incrementally drive said capstan including means selectively operable to drive said capstan and means to stop said capstan in response to said stop pulses, and
means selectively operable to record signals on said magnetic storage tape in response to and at the time of said stop pulses.

10. An incremental tape transport comprising,
a capstan for driving magnetic storage tape,
magnetic storage tape driven by said capstan,
a tone wheel driven by said capstan and operable to produce pulses as said capstan rotates through equidistant angular positions,
means to incrementally drive said capstan, and
means selectively operable to record signals on said magnetic storage tape in response to and at the time of said pulses.

References Cited

UNITED STATES PATENTS

| | | | |
|---|---|---|---|
| 3,275,208 | 9/1966 | Poumakis | 226—9 |
| 3,332,084 | 7/1967 | Wahrer et al. | 346—74 |
| 3,357,002 | 12/1967 | Smith-Vaniz et al. | 340—174.1 |
| 3,175,777 | 3/1965 | Jones | 242—55.11 |
| 3,258,755 | 6/1966 | Guerth | 340—174.1 |

FOREIGN PATENTS

| | | |
|---|---|---|
| 800,439 | 8/1958 | Great Britain. |

STANLEY M. URYNOWICZ, Jr., *Primary Examiner.*

V. P. CANNEY, *Assistant Examiner.*

U.S. Cl. X.R.

226—32, 33, 37